No. 881,430. PATENTED MAR. 10, 1908.
W. N. MERRITT.
LAWN MOWER.
APPLICATION FILED APR. 30, 1907.
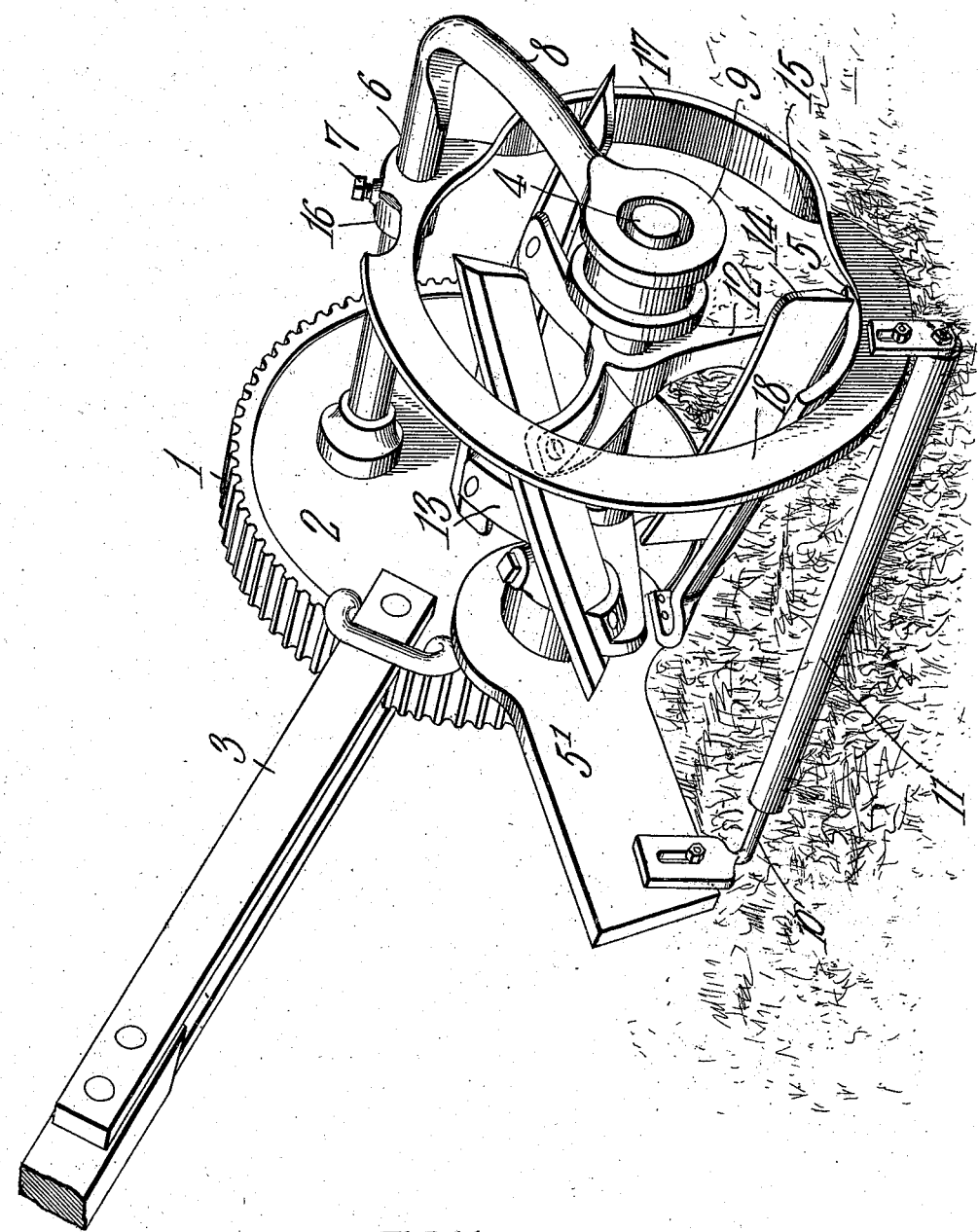
WITNESSES: William N. Merritt, INVENTOR
By C. A. Snow & Co.
ATTORNEYS

UNITED STATES PATENT OFFICE.

WILLIAM NEIL MERRITT, OF NOCONA, TEXAS.

LAWN-MOWER.

No. 881,430.  Specification of Letters Patent.  Patented March 10, 1908.

Application filed April 30, 1907. Serial No. 371,068.

*To all whom it may concern:*

Be it known that I, WILLIAM NEIL MERRITT, a citizen of the United States, residing at Nocona, in the county of Montague and State of Texas, have invented a new and useful Lawn-Mower, of which the following is a specification.

This invention has relation to lawn mowers and it consists in the novel construction and arrangement of its parts as hereinafter shown and described.

The object of the invention is to provide a lawn mower having a rotating series of blades which are operated by a single ground wheel. The object being to provide a mower which may be used for trimming a lawn in close proximity to fences or trees wherein the ends of the blades further away from the ground wheel may operate close to the fence or tree without interference.

In the accompanying drawing:—the figure is a perspective view of the lawn mower.

The ground wheel 1 is closed at one side by a disk 2 as is usual in lawn mower construction. The staff or handle 3 is connected with the disk 2 and journaled upon the axle (not shown) of the ground wheel 1. As the means for transmitting movement from the wheel 1 to the shaft 4 forms no part of this invention and may be such as is commonly used in such constructions it is deemed unnecessary to describe such means in this specification.

The blade 5 is attached to arm 5' supported by the disk 2. The arm 6 is also attached to the disk 2 and extends over the shaft 4 in parallel relation with the same and has its opposite end bent at an angle, as at 8, and provided with a bearing 9 which receives the end of the shaft 4 opposite to that end thereof that passes through the ground wheel 1. The bracket 10 is located behind the blade 5 and is provided with a ground roller 11. The shaft 4 is provided with the arms 12 and 13 to which are attached the blades 14.

From the foregoing description it is obvious that a lawn mower is provided which may accomplish the object stated. The brace 15 is provided with a collar 16 which receives the arm 6 and may be adjusted longitudinally thereof. The forward portion 17 of the said brace is relatively broad in a line parallel with the shaft 4 while the rear portion 18 of the said brace is relatively thin in a line parallel with the shaft 4. The lower end of the portion 18 bears upon the ground and forms a support for that side of the mower which is minus the usual ground wheel.

Having described my invention what I claim as new and desire to secure by Letters-Patent is:—

1. A single-wheel lawn mower, means for propelling the same, blades journaled for rotation thereon, a fixed blade carried thereby, an arm located in advance of the rotating blades and having a branch provided with a journal-bearing which receives the shaft of the rotating blades and a brace carried by said arm and surrounding the rotating blades.

2. A single-wheel lawn mower comprising a ground wheel, means for propelling the same, rotating blades carried by the same, a fixed blade carried by the same, an arm located in advance of the rotating blades and having a branch provided with a journal bearing which receives the shaft of the rotating blades, a brace adjustably mounted upon said arm and surrounding the rotating blades.

3. A single-wheel lawn mower comprising a ground wheel, blades journaled for rotation thereon, a fixed blade carried thereby, an arm located in advance of the rotating blades and having a branch provided with a journal bearing which receives the shaft of the rotating blades, a circular runner mounted upon the arm and being twisted so that its opposite sides lie in different planes.

In testimony that I claim the foregoing as my own, I have hereto affixed my signature in the presence of two witnesses.

WILLIAM NEIL MERRITT.

Witnesses:
 M. N. HERN,
 J. H. ADDISON.